United States Patent [19]

Fink

[11] 4,448,620

[45] May 15, 1984

[54] METHOD AND APPARATUS FOR THE INJECTION MOLDING AND VULCANIZATION OF VEHICLE TIRES

[75] Inventor: Lothar Fink, Achim-Baden, Fed. Rep. of Germany

[73] Assignee: Klockner-Werke AG, Duisburg, Fed. Rep. of Germany

[21] Appl. No.: 355,787

[22] Filed: Mar. 8, 1982

Related U.S. Application Data

[62] Division of Ser. No. 244,400, Mar. 16, 1981.

[30] Foreign Application Priority Data

Mar. 22, 1980 [DE] Fed. Rep. of Germany ....... 3011199

[51] Int. Cl.$^3$ .................... B29H 17/00; B29H 5/02
[52] U.S. Cl. ................................ 156/125; 156/394.1; 152/357 A; 264/255; 264/315; 264/326; 425/43; 425/46; 425/47; 425/56
[58] Field of Search ............ 156/125, 394 R, 394 FM, 156/394.1; 152/357 A; 425/43, 46, 47, 54–57, 425/190, 28 B; 264/255, 315, 326

[56] References Cited

U.S. PATENT DOCUMENTS

| | | | |
|---|---|---|---|
| 3,276,930 | 10/1966 | Keefe | 425/43 |
| 3,974,018 | 8/1976 | Arimura et al. | 156/125 |
| 4,057,447 | 11/1977 | Holroyd et al. | 156/125 |
| 4,059,375 | 11/1977 | Koch et al. | 425/589 |
| 4,063,861 | 12/1977 | Schmidt et al. | 425/35 |
| 4,230,511 | 10/1980 | Olsen | 156/123 R |
| 4,272,309 | 6/1981 | Payne et al. | 156/124 |

FOREIGN PATENT DOCUMENTS

| | | |
|---|---|---|
| 2203030 | 7/1973 | Fed. Rep. of Germany. |
| 2514973 | 10/1978 | Fed. Rep. of Germany. |
| 1213574 | 11/1970 | United Kingdom ............... 156/128 |

*Primary Examiner*—Lois E. Boland
*Attorney, Agent, or Firm*—Sughrue, Mion, Zinn, Macpeak and Seas

[57] ABSTRACT

A vehicle tire crown portion 10 including a tread 11 is injection molded and prevulcanized in a closed annular mold cavity 17 defined by a segmented outer mold 16 clamped together by a locking ring 22 and a segmented core 19 pressed against the outer mold by upper and lower pressure plates 25, 26. The core is then removed by disassembling its segments, whereafter a carcass 14 and prevulcanized sidewalls 12, 13 are placed in the central portion of the mold on an inflatable air bag 38 flanked by lateral mold section 39, 40. The vulcanization of the tire assembly is then completed, during which the sidewalls are joined to the retained crown portion.

8 Claims, 4 Drawing Figures

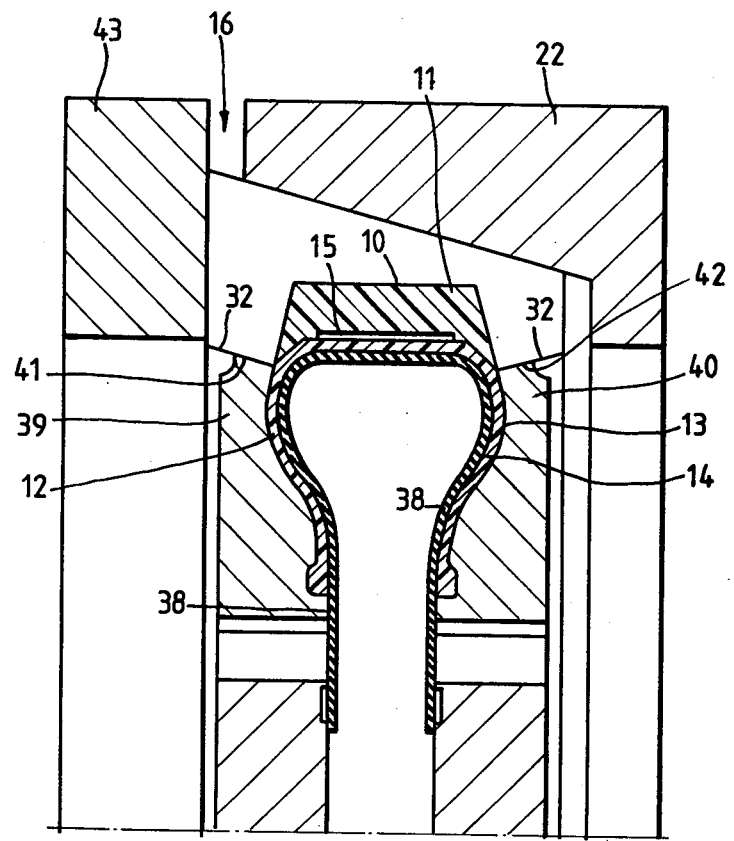

METHOD AND APPARATUS FOR THE INJECTION MOLDING AND VULCANIZATION OF VEHICLE TIRES

This is a Division of application Ser. No. 244,400, filed Mar. 16, 1981.

BACKGROUND OF THE INVENTION

This invention relates to a method and apparatus for the production of vehicle tires having the usual crown portion, carcass and sidewalls by means of a combination injection molding and vulcanization device.

Inflatable vehicle tires are conventionally produced by labor-intensive processes which have been known for many years. The carcass and sidewalls are usually fabricated and prevulcanized on a tire mounting machine using raw rubber, whereafter the separately produced and prevulcanized crown portion (without tread) is placed on the carcass. This assembly is then placed in a vulcanizing press which completes the vulcanization process and simultaneously forms the tread configuration. The crown portion can be placed on the carcass as a finite strip or as an endless ring. With the latter alternative the crown portion is expanded during final vulcanization. The separately produced crown portions are kept in readiness in an intermediate storage area and are removed therefrom according to production requirements. This conventional tire production process is labor-intensive and time consuming owing to the multitude of operations which must be at least partially carried out manually. Furthermore, the finished vehicle tire is frequently non-uniformly shaped which results in balancing problems, particularly in the area of the relatively large crown portion.

The production of vehicle tires by injection molding or casting is disclosed in German Pat. No. 2,514,973, according to which the rubber crown portion and sidealls are formed in a specially designed injection mold into which the carcass and possibly a reinforcing belt resting on a core are placed. The production or finishing of the tire is effected in two injection cycles. In the first cycle the tire sidewalls are injection molded in adjacent cavities, whereafter the mold is restructured and the crown portion is then injection molded and simultaneously joined to the sidewalls.

The tire produced by this process is characterized by thicker than usual sidewalls since the conventional canvas support or reinforcement is eliminated, and the sidewalls must thus be thickened to provide a sufficient tensile load capability. The vehicle tire produced in this manner thus has different characteristics and behavior as compared with conventional tire designs.

SUMMARY OF THE INVENTION

An object of the present invention is thus to provide a method and apparatus for the production of vehicle tires by the injection molding of rubber which permits a more effective use of current injection molding technology without having any disadvantageous effects on the design or life of the tire. To implement this object the method of the present invention is characterized by first injection molding the crown portion of the tire in a closed annular cavity, then opening the center portion of the mold and placing therein the carcass and prevulcanized sidewalls, and finally completing the vulcanization of the complete tire while simultaneously joining the sidewalls and carcass to the crown portion.

This invention is based, inter alia, on the recognition that the production of the crown portion of a tire is particularly critical owing to the relatively large amount of rubber material required therefor. To utilize the full advantages of injection molding technology, the crown portion is first produced in an annular mold cavity which is surrounded on all sides by rigid, immovable and inelastic components. This results in a very uniformly dimensioned crown portion, which constitutes the main and most critical part of the tire.

The crown portion is provided with a complete tread during such injection molding but is only prevulcanized, whereafter the carcass and sidewalls are provided in a suitable manner and the tire assembly is then finally vulcanized. The carcass and sidewalls may be separately produced with an existing tire mounting machine and thereafter inserted into the opened injection mold and pressed against the crown portion by an inflatable air bag, whereafter final vulcanization takes place.

The crown portion is retained in the injection mold after the intermediate opening thereof such that the sensitive tread area remains in its original position within the mold cavity. To implement this the mold assembly is opened in its central or core portion after the injection molding of the crown portion to enable the introduction of the carcass and sidewalls.

This is accomplished in as short a time as possible whereby the prevulcanized and still hot crown portion is not cooled to any appreciable degree, whereby the thermal energy required for the subsequent final vulcanization of the complete tire is minimized. This constitutes a significant advantage over the intermediate storage and thus cooling of the separately produced crown portions, as in the prior art.

BRIEF DESCRIPTION OF THE DRAWINGS

In the drawings

FIG. 4 shows a radial cross-section of the injection mold of FIG. 2 after reassembly to implement final tire vulcanization.

DETAILED DESCRIPTION OF THE PREFERRED EMBODIMENT

Figure 1:
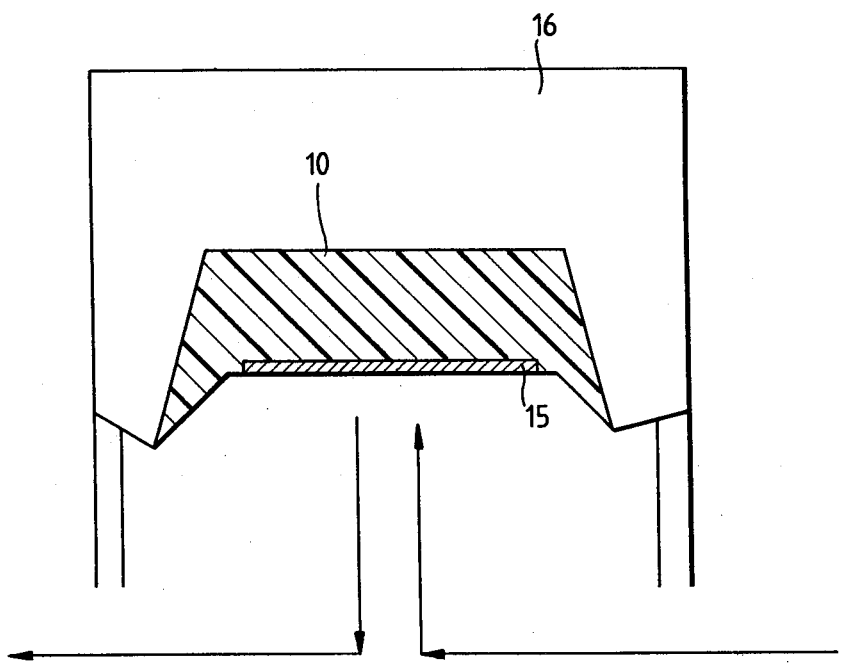
FIG. 1 shows a simplified schematic radial cross-section through a portion of an injection mold, including arrows to indicate functional movements during production.

A vehicle tire normally includes a crown portion 10 having a road engaging tread 11, a carcass 14 vulcanized or otherwise secured to the inner surface of the crown portion and flanked by side walls 12, 13, and a reinforcing belt 15 of either the radial or bias ply type.

According to the present invention the crown portion 10 is produced by injection molding or die casting, the carcass 14 including the side walls 12, 13 is separately fabricated in a conventional manner in a tire mounting machine (not shown), and the latter components are then joined to the crown portion by completing the vulcanization process to produce the finished vehicle tire.

Figure 2:
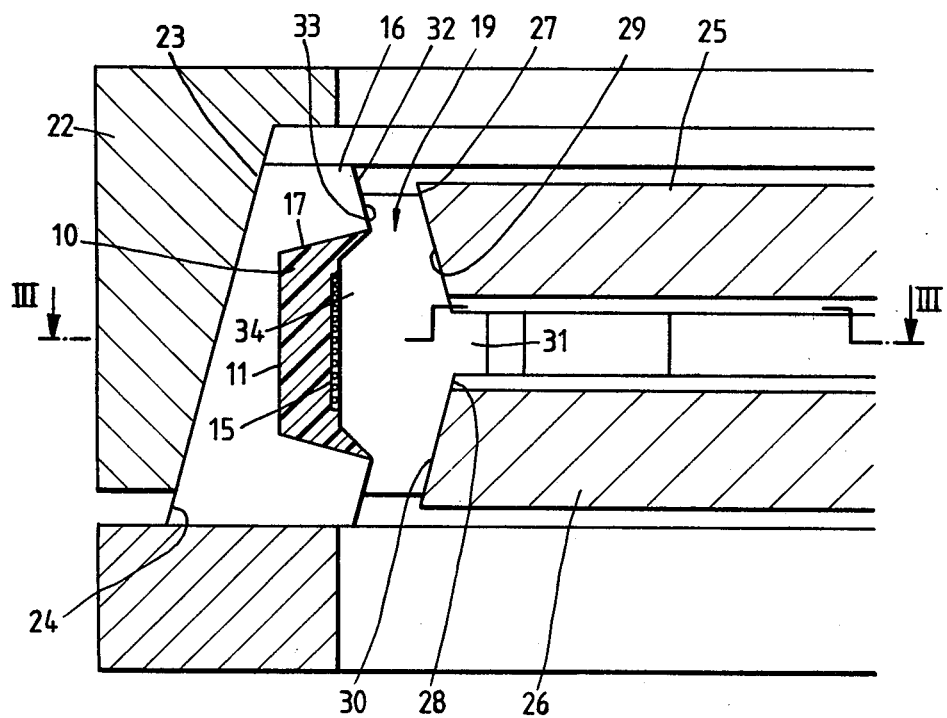
FIG. 2 shows a more detailed radial cross-section through an injection mold for tire fabrication in accordance with the present invention.
Figure 3:
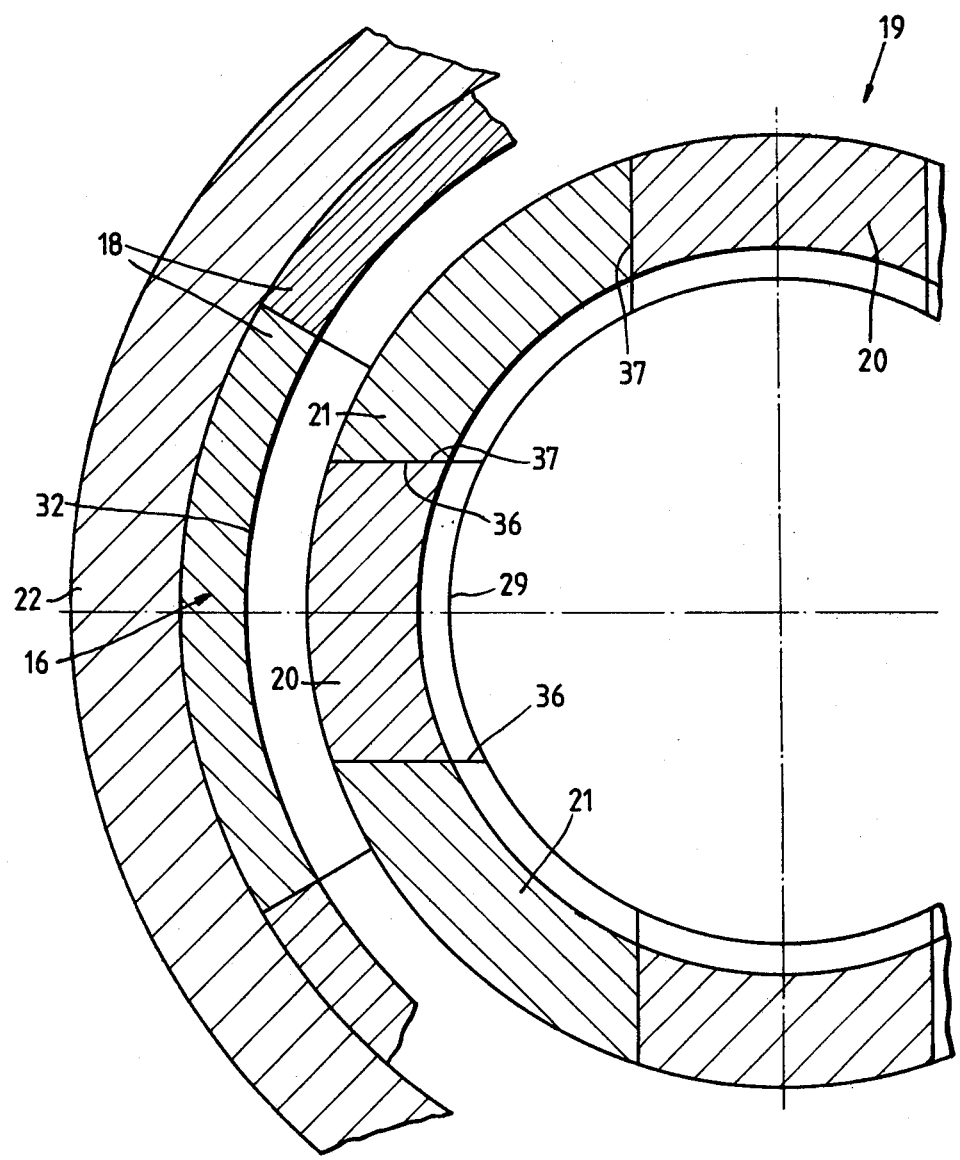
FIG. 3 shows a transverse axial section taken along line III—III of FIG. 2.

The above described processes involving the molding of the crown portion and the joining thereto of the carcass and side walls are implemented, according to this invention, in a single and versatile combination injection molding and vulcanization apparatus as shown in FIGS. 2 and 3. Such apparatus includes an annular shaped outer mold 16 having an annular recess around its inner periphery which defines a mold cavity 17 for the fabrication of the crown portion 10. The radially outer surface of this cavity is configured to form the tire tread 11 in a desired pattern during the molding of the crown portion. The outer mold 16 comprises a plurality of circumferentially abutting segments 18 which are closely dimensioned and joined together to form a continuous mold cavity.

The cavity 17 is limited on its radially inner side by a mold core 19 which sealingly mates with the outer mold 16 and which similarly comprises a plurality of circumferentially abutting core segments 20 and 21. Rigid, highly chargeable closing elements are associated with the outer mold 16 and the core 19 to transfer thereto the necessary sealing and clamping forces derived from pressurized hydraulic cylinders or the like, not shown. Such elements include a locking ring 22 having a conical inner surface 23 which engages a similarly shaped conical counter surface 24 on the outer periphery of the outer mold 16. The outer mold segments 18 can be released and radially separated to enable, for example, the removal of the finished vehicle tire by raising the locking ring 22.

A pair of circular and axially aligned pressure plates 25 and 26 act on the mold core 19 from above and below to urge its segments 20, 21 outwardly and into tight engagement with the inner outer mold 16. These plates have conically converging outer peripheral surfaces 27 and 28 which bear against correspondingly angled conical counter surfaces 29 and 30 of the core 19. These counter surfaces terminate at and are separated by a continuous central projection 31 of the core 19. With this configuration when the pressure plates 25, 26 are urged towards each other by the application of hydraulic force they act to cam the core segments 20, 21 radially outwards and against the outer mold 16, which at the same time is being radially inwardly compressed by the locking ring 22.

The outer mold 16 and core 19 are provided with correspondingly configured and engaging sealing surfaces 32 and 33 flanking the cavity 17. The surfaces 33 of the core 19 terminate at a central projection 34 of the core which penetrates into the cavity 17 to define the inner surface of the crown portion 10. The configuration of the projection 34 also implements the centering and alignment of the core segments 20, 21 relative to the outer mold 16.

The various mold components described above are preferably fabricated of a rigid metallic material which has a high coefficient of thermal conductivity. The assembled components define a continuous annular mold cavity 17 for the fabrication of the crown portion 10 which is fully surrounded and enclosed on all sides by the mold components, with the exception of a plurality of injection channels which are not shown in detail. This enables the fabrication of a molded crown portion having a precise and maximized degree of dimensional conformity.

The crown portion 10 is injection molded and prevulcanized in the mold assembly shown in FIGS. 2 and 3, and at the same time the separately provided reinforcing belt 15 is molded into the inner surface of the crown portion. For such purpose the belt 15 is placed over the core 19 surrounding the projection 34 before the mold is closed.

After the production of the pre-vulcanized crown portion 10 the mold assembly is opened as schematically shown by the arrows in FIG. 1. This is accomplished by first axially separating the pressure plates 25, 26, next drawing the core segments 20 radially inwardly towards the axial center of the assembly, and finally drawing the core segments 21 radially inwardly in a similar manner. To enable this sequence the lateral surfaces 36 of the segments 20 are parallel to each other, while the lateral surfaces 37 of the segments 21 are convergingly oriented. During such intermediate breaking of the mold assembly the outer mold 16 remains closed as shown in FIGS. 2 and 3 with the locking ring 22 still in place and the pre-vulcanized crown portion 10 remaining engaged within the cavity 17 and specifically remains engaged against an inner surface of the outer mold 16.

The previously partially fabricated and pre-vulcanized carcass 14 with its side wall portions 12, 13 is now introduced into the open interior of the mold by placing it on an inflatable air bag 38. This air bag is flanked by a pair of lateral mold sections 39, 40 having conical outer surfaces 41 and 42 which closely engage the correspondingly sloped conical surfaces 32 of the outer mold 16 resulting in the air bag being enclosed in an area enclosed by the outer mold so that the air bag 38 occupies at least part of an area previously occupied by the removable mold core 19. The air bag 38 is inflated in a conventional manner while the lateral mold sections 39, 40 are restrained against axial separation to thereby urge the carcass 14 including the side walls 12, 13 and the crown portion 10 into tight engagement along all surfaces with the mold components, with the carcass being pressed against an inner surface of the crown portion 10 retained in the outer part of the cavity 17. Heat is then applied by conventional means, not shown, to complete the vulcanization process and to firmly join the crown portion to the carcass and side walls.

The carcass and side walls can be produced and pre-vulcanized in a conventional tire mounting machine; alternatively, the side walls can be produced by injection molding.

The disclosed combination injection molding and vulcanization apparatus is mounted in a horizontal orientation on a lower bearing ring 43, which may comprise a component of a circumferential tire production system, i.e. a turntable.

What is claimed is:

1. A method for producing vehicle tires, comprising the steps of:
   (a) injection molding and prevulcanizing a crown portion (10) having treads (11) in a closed annular mold cavity (17) an outer part of which is defined by an annular outer mold (16) and an inner part of which is defined by an inner removable mold core (19) which comprises a plurality of circumferentially abutting radially movable segments and wherein pressing means are provided for urging said removable mold core and said outer mold radially toward one another to mold said crown portion after a crown portion building material has been injected into said annular mold cavity,
   (b) opening the cavity by removing the inner removable mold core and keeping said crown portion against an inner surface of said annular outer mold, (c) placing a carcass (14) having prevulcanized sidewalls (12, 13) in abutment with an exposed inner surface of said crown portion retained in said outer part of said cavity, and (d) completing the vulcanization of the crown portion and sidewalls, and simultaneously joining the sidewalls to the crown portion.

2. A method as defined in claim 1, wherein the carcass and sidewalls are produced on a conventional tire mounting machine.

3. A method as defined in claims 1 or 2, further comprising the step of placing a reinforcing belt (15) around the inner periphery of the mold cavity so as to be in contact with the crown portion.

4. A method according to claims 1 or 2, wherein the carcass and sidewalls are placed in abutment with said inner surface of said crown portion by inserting an inflatable air bag (38) into an area enclosed by said outer mold so that said air bag occupies at least part of an area previously occupied by said inner removable mold core.

5. A method as defined in claim 1, said opening step including the step of drawing said radial segments radially inward.

6. A method as defined in claim 5, wherein said pressing means includes a pair of axially aligned and spaced pressure plates (25, 26) which are pressed axially towards one another to radially urge said radial segments radially outward while radial outward movement of said outer mold plates is restricted by using an outer locking ring (22).

7. A method as defined in claim 1, further comprising the step of keeping said crown portion against an inner surface of said annular outer mold as said cavity is opened and said carcass is placed in abutment with said inner surface of said crown portion.

8. A method as defined in claim 6, further comprising the step of keeping said crown portion against an inner surface of said annular outer mold as said cavity is opened and said carcass is placed in abutment with said inner surface of said crown portion.

* * * * *